US012564909B2

(12) United States Patent  
Mattes et al.

(10) Patent No.: US 12,564,909 B2  
(45) Date of Patent: Mar. 3, 2026

(54) MOTOR SPINDLE

(71) Applicant: Maschinenfabrik Berthold Hermle AG, Gosheim (DE)

(72) Inventors: Uwe Mattes, Denkingen (DE); Ajet Ademi, Rottweil (DE); Franz-Xaver Bernhard, Spaichingen (DE)

(73) Assignee: Maschinenfabrik Berthold Hermle AG, Gosheim (DE)

(*) Notice: Subject to any disclaimer, the term of this patent is extended or adjusted under 35 U.S.C. 154(b) by 467 days.

(21) Appl. No.: 18/107,089

(22) Filed: Feb. 8, 2023

(65) Prior Publication Data

US 2023/0249302 A1 Aug. 10, 2023

(30) Foreign Application Priority Data

Feb. 9, 2022 (EP) .................................... 22155966

(51) Int. Cl.  
B23Q 5/10 (2006.01)  
B23Q 1/70 (2006.01)

(52) U.S. Cl.  
CPC .............. B23Q 5/10 (2013.01); B23Q 1/706 (2013.01); B23Q 2705/145 (2013.01)

(58) Field of Classification Search  
CPC .............. B23B 47/34; B23B 2220/36; B23B 2260/008; B23Q 5/04; B23Q 5/20;  
(Continued)

(56) References Cited

U.S. PATENT DOCUMENTS 5,088,362 A * 2/1992 Schalles ............... B23Q 11/127  
82/900  
5,100,271 A * 3/1992 Kameyama ......... F16H 25/2018  
408/239 R  
(Continued)

FOREIGN PATENT DOCUMENTS

DE 100 27 750 A1 12/2001  
DE 10163089 C1 * 7/2003 ......... B23Q 17/2225  
(Continued)

OTHER PUBLICATIONS

Japanese Office Action dated Mar. 26, 2025.  
European Search Report.

*Primary Examiner* — Nicole N Ramos  
(74) *Attorney, Agent, or Firm* — Hoffmann & Baron, LLP

(57) ABSTRACT

A motor spindle including a sleeve-shaped stator, which has a first coupling receptacle and a second coupling receptacle, further including a rotor, which has a first coupling part with axial fixed bearing and a second coupling part with axial loose bearing, which are to be mounted to the respective coupling receptacle, the axial loose bearing comprising an inner ring mounted to the rotor shaft and an outer ring arranged coaxially with the inner ring and mounted to the second coupling part, wherein the second coupling part is received on the rotor shaft so as to be axially movable parallel to the rotor axis between a first functional position and a second functional position along an adjustment path and wherein for the entire adjustment path there is a first distance between a first axial surface of the inner ring and the second coupling part and there is a second distance between a second axial surface of the inner ring and the second coupling part.

12 Claims, 6 Drawing Sheets

(58) Field of Classification Search
CPC . B23Q 1/52; B23Q 1/287; B23Q 1/70; B23Q 17/00; B23Q 17/2225; B23Q 17/2241; B23Q 11/1015; B23Q 11/1023; B23Q 11/103; B23Q 2220/006
See application file for complete search history.

(56) References Cited

U.S. PATENT DOCUMENTS

| | | | | |
|---|---|---|---|---|
| 7,318,692 B2 * | 1/2008 | Herla | .................... | B23Q 5/04 |
| | | | | 279/155 |
| 8,579,561 B2 * | 11/2013 | Inoue | ................. | B23Q 17/003 |
| | | | | 409/233 |
| 10,201,882 B2 * | 2/2019 | Van Sprang | ............ | B23Q 5/10 |
| 2002/0158541 A1 * | 10/2002 | Schuettel | ............... | B23Q 5/10 |
| | | | | 82/147 |
| 2004/0208720 A1 * | 10/2004 | Wehrfritz | ............... | B23Q 1/70 |
| | | | | 409/231 |
| 2019/0076976 A1 * | 3/2019 | Gerst | .................... | B23Q 37/00 |
| 2019/0232445 A1 * | 8/2019 | Van Sprang | ............ | B23Q 1/44 |

FOREIGN PATENT DOCUMENTS

| | | | | | |
|---|---|---|---|---|---|
| DE | 10 2011 116 703 A1 | | 4/2013 | | |
| EP | 1920880 A1 | * | 5/2008 | ............. | F16C 39/02 |
| JP | 10-277819 A | | 10/1998 | | |
| JP | 2008-099491 A | | 4/2008 | | |

* cited by examiner

MOTOR SPINDLE

BACKGROUND OF THE INVENTION

The invention relates to a motor spindle for driving a machining tool, having a sleeve-shaped stator which extends along a stator axis and has a first magnet system, a first coupling receptacle and a second coupling receptacle, the motor spindle having a rotor which has a rotor shaft extending along a rotor axis, a second magnet system, a first coupling part and a second coupling part, wherein the first coupling part is mounted to the first coupling receptacle and is connected with the rotor shaft rotatably about the rotor axis by means of a first rolling bearing, which is an axial fixed bearing, and wherein the second coupling part is mounted to the second coupling receptacle and is connected with the rotor shaft rotatably about the rotor axis by means of a second rolling bearing which is an axial loose bearing, wherein the second rolling bearing comprises an inner ring fixed on the rotor shaft and an outer ring arranged coaxially with respect to the inner ring and fixed on the second coupling part, which outer ring together with the inner ring delimits a circular ring-shaped bearing gap in which a plurality of rolling elements are accommodated, wherein the second coupling part is accommodated on the rotor shaft so as to be axially movable parallel to the rotor axis between a first functional position and a second functional position along an adjustment path.

A motor-driven machine tool unit, in particular a motor spindle, is known from DE 10 2011 116 703 A1. This comprises a rotor unit with a rotor shaft rotatable about an axis of rotation, wherein, at least in the dismantled state, the rotor unit comprises at least one first bearing unit arranged in the end region of a tool and/or workpiece holder and a second bearing unit arranged at the oppositely directed end region for mounting the rotor shaft in a stator unit in the installed state, wherein the second bearing unit is designed as a loose bearing of the rotor shaft and wherein at least one relief device is provided for relieving the loose bearing in the installed state.

SUMMARY OF THE INVENTION

The task of the invention is to provide a motor spindle which allows a highly precise and reproducible replacement of the rotor.

This task is solved for a motor spindle of the type mentioned at the beginning with the following features: there is a first distance between a first axial surface of the inner ring and the second coupling part, which first distance is always greater than zero for the entire adjustment path (along the entire adjustment path), and there is a second distance between a second axial surface of the inner ring, which faces away from the first axial surface, and the second coupling part, which second distance is always greater than zero for the entire adjustment path (along the entire adjustment path).

Accordingly, it is provided that irrespective of the relative position of the second coupling part, which can be moved along the travel distance between the first functional position and the second functional position with respect to the rotor shaft, there is always a first air gap between the first axial surface of the inner ring and the second coupling part, which first air gap is defined by the first distance, and there is always a second air gap, between the second axial surface of the inner ring and the coupling part, which second air gap is defined and the second distance. Both the first distance and the second distance always have a value greater than zero in any position of the second coupling part, which may be moved parallel to the rotor axis between a first functional position and a second functional position along the entire adjustment path. This feature ensures during operation of the motor spindle that no contact occurs between the second coupling part and the inner ring of the second rolling bearing, which could lead to damage to the second rolling bearing. Furthermore, when the rotor is removed, this feature ensures that the second rolling bearing cannot be unintentionally disassembled.

For an assembly of the rotor into the stator, it is provided that the first coupling part is received at the first coupling receptacle and is fixed there, so that the first rolling bearing, which is designed as an axial fixed bearing, ensures a rotational bearing of the rotor shaft relative to the stator at a first bearing point.

It is further provided that the second coupling part, which is also referred to as a bearing sleeve, is fixed to the second coupling receptacle, which is also referred to as a bearing seat, so that the second rolling bearing, which is designed as an axial loose bearing, forms a second bearing location for the rotor shaft. By designing the first rolling bearing as an axial fixed bearing and designing the second rolling bearing as an axial loose bearing, it is achieved that thermal influences occurring during operation of the motor spindle, which can lead to different expansions of the stator and the rotor, can be compensated by a displacement in the second rolling bearing and do not lead to an undesired introduction of forces on the first rolling bearing and the second rolling bearing.

By way of example, it can be provided that the first rolling bearing is designed as an arrangement of a plurality of rolling bearings, preferably a plurality of ball bearings, in particular a plurality of angular ball bearings, wherein the rolling bearings can be arranged in an O arrangement, particularly preferably as angular contact ball bearings.

The second rolling bearing is configured as an axial loose bearing, so that different thermal expansions of stator and rotor can be compensated by an axial displacement of the inner ring which is fixed on the rotor shaft, relative to the outer ring which is fixed on the second coupling part. The rolling elements arranged in the annular bearing gap between the inner ring and the outer ring of the second rolling bearing and the respective bearing surfaces on the outer ring and the inner ring are adapted to an axial relative mobility between the inner ring and the outer ring. Preferably, it is provided that the displacement distance along which the second coupling part can be moved between the first functional position and the second functional position along the rotor axis is smaller than a maximum displacement distance of the second rolling bearing, which maximum distance is determined by the design of the second rolling bearing and defines the distance which the outer ring can move relative to the inner ring before rolling elements emerge from the bearing gap. It is further provided that the displacement distance, which is provided with a safety margin, is greater than a maximum expansion difference between the rotor and the stator, such as may occur during intended use of the motor spindle.

Preferably, it is provided that the inner ring is circular-cylindrical, optionally with a conical inner circumferential surface, and that the first axial surface of the inner ring, which can also be referred to as the first axial end surface, and the second axial surface of the inner ring, which can also be referred to as the second axial end surface, are each circular-ring-shaped. Particularly preferably, it is provided that the first axial surface is arranged in a first axial plane which is aligned transversely to the rotor axis of the rotor shaft and that the second axial surface is arranged in a second axial plane which is likewise aligned transversely to the rotor axis of the rotor shaft, so that the two axial planes are aligned parallel to one another.

It is further provided that both the first distance between the first axial surface of the inner ring and the second coupling part and the second distance between the second axial surface of the inner ring and the second coupling part do not disappear (are always greater than zero) for the entire adjustment path between the first functional position and the second functional position. This means that there is always a first air gap and a second air gap between the second coupling part and the inner ring in the axial direction with respect to both the first axial surface and the second axial surface, and accordingly there is no contact between the second coupling part and the inner ring.

Exemplarily, it is provided that the second coupling part is at least substantially rotationally symmetrical with respect to the rotor axis of the rotor shaft and has a U-shaped profiling in a cross-sectional plane encompassing the rotor axis, as a result of which a circumferential groove is formed which is open inwardly in the radial direction and in which the outer ring of the second rolling bearing is received in a force-fitting and/or form-fitting manner.

Preferably, the coupling part comprises two separate annular parts which are connected to one another in the axial direction and which thereby enable the outer ring to be received in the circumferential groove.

Advantageous further embodiments of the invention are the subject of the subclaims.

It is expedient if at least one latch recess, in particular recessed inwardly in the radial direction, is formed on an outer surface of the second coupling part, and if the second coupling receptacle is provided on an inner circumferential surface with a plurality of latches, in particular arranged at uniform angular pitch, the latches being adjustable between a release position, in particular a radially outer position, and a locking position, in particular a radially inner position, and being designed in the locking position for positive engagement in the latch recess. Through the interaction between the at least one latch associated with the second coupling receptacle of the stator and the latch recess in the outer surface of the second coupling part associated with the rotor, an, in particular axial, fixing of the second coupling part to the second coupling receptacle can be effected. Preferably, the two coupling receptacles as well as the two coupling parts are configured in such a way that coupling of the rotor to the stator is ensured by locking the first coupling part in the first coupling receptacle and the second coupling part in the second coupling receptacle. For this purpose, it is advantageous if the at least one latch or the plurality of latches can be adjusted between a radially outer release position and a radially inner locking position. Preferably, it is provided that the at least one latch or the plurality of latches in the locking position can transmit radially inwardly directed latching forces, which are in particular oriented with 90 degrees to the rotor axis of the rotor, from the second coupling receptacle of the stator to the second coupling part of the rotor. It is particularly advantageous if, the latching force exerted by the respective latch, which can also be referred to as the normal force for the second coupling part, both a radially inwardly directed force component and a force component directed in the axial direction along the rotor axis are exerted on the rotor. This reliably secures the rotor to the stator both in the radial direction and in the axial direction.

Preferably, it is provided that in the locking position the latches bear, in particular exclusively, against an inclined surface of the latch recess. The inclined surface is aligned at an acute angle to the rotor axis in order to introduce an axial latch force component which is aligned along the rotor axis in the direction of the locking position from the second coupling receptacle to the second coupling part. The latch recess can optionally be formed as a bore or as a circumferential groove in an outer circumferential surface of the second coupling part. It is crucial for reliable locking of the rotor to the stator that the latch recess has an inclined surface against which the latch comes into contact in the locked position. The inclined surface can correspond in particular to a contact surface between the latch and the latch recess. The decisive factor is that the contact surface or inclined surface must satisfy the condition that it is aligned at an acute angle to the rotor axis. In view of the tolerances to be taken into account for the geometries of the latch, the inclined surface and the two coupling receptacles and the associated coupling parts, this condition can be realized in an advantageous manner by an entire contact area in which contact between the latch and the latch recess is possible assuming an acute angle to the rotor axis. Assuming that the latch exerts a latching force on the inclined surface that is directed radially inwards towards the rotor axis and preferably transverse to the rotor axis, the alignment of the inclined surface results in a splitting of this latching force into a force component directed radially inwards and a further force component directed parallel to the rotor axis. This ensures the desired radial and axial locking of the rotor to the stator.

In an alternative embodiment of the latch, it is provided that the latch is adjustable along a latch path between the release position and the locking position respectively, the latch path being aligned at an acute angle to the rotor axis. Preferably, in this case, it may be provided that latch paths of a plurality of latches received in the second coupling receptacle are arranged on an enveloping surface shaped like a section of a cone surface.

In a further embodiment of the invention, it is provided that an inner surface of the second coupling receptacle and an outer surface of the second coupling part are geometrically similar, in particular in each case cone-section-shaped, at least in regions, in order to ensure positive reception of the second coupling part in the second coupling receptacle both in the radial direction and in a locking direction aligned along the rotor axis. On the one hand, such a geometric design of the second coupling receptacle and the second coupling part can provide a highly precise centering of the second coupling part relative to the second coupling receptacle. On the other hand, the conical shape which the second coupling receptacle and the second coupling part have in each case in certain areas supports an advantageous disassembly process for the second coupling part from the second coupling receptacle. This is due to the fact that even a slight axial displacement of the second coupling part relative to the second coupling receptacle leads to a complete detachment of the opposing inner surface of the second coupling receptacle and the outer surface of the second coupling part. Preferably, a taper angle is provided for the tapered surfaces in a range between 17 and 19 degrees in order to realize an advantageous centering effect between the second coupling receptacle and the second coupling part on the one hand and to avoid an undesired self-locking effect on the other hand.

In one embodiment of the invention, it is provided that a first linear stop is formed on the rotor shaft, against which the second coupling part bears in the first functional position, and that a second linear stop is formed on the rotor shaft, against which the second coupling part bears in the second functional position. The task of the first linear stop and the second linear stop is to limit an axial displacement of the second coupling part with the outer ring of the second rolling bearing received therein to a predetermined adjustment path in a disassembled state of the rotor. The adjustment path is selected in such a way that it is always ensured that the rolling elements of the second rolling bearing remain in the bearing gap between the inner ring and the outer ring. Furthermore, the adjustment path is selected in such a way that any changes in length that occur between the rotor and stator, in particular caused by temperature changes, do not cause the second coupling part to be transferred to the first or second functional position. Accordingly, the second coupling part as well as the first linear stop and the second linear stop are matched to each other in such a way that in an installed state of the rotor in the stator, which can also be referred to as the operating state for the motor spindle, even taking into account all tolerances and linear expansions of the individual components, contact of the second coupling part both with the first linear stop and with the second linear stop is excluded.

In an advantageous further development of the invention, it is provided that the second coupling receptacle has a latch guide which is displaceable in a relatively movable manner, in particular in a linearly movable manner, along the stator axis and which is provided with guide recesses in which the latches are movably accommodated transversely to the stator axis, wherein the latch guide is movably mounted on a guide sleeve which is provided with a control surface which is designed for movement control of the latches in such a way that a relative movement of the latch guide relative to the guide sleeve causes displacement of the latches in the radial direction. The task of the latch guide is thus on the one hand to ensure synchronization for relative movements of the individual latches, the latches being received for this purpose in the guide recesses of the latch guide. The guide recesses are dimensioned in such a way that the latches are moved, at least almost, without play during a relative movement of the latch guide along the stator axis and are thus synchronized with the relative movement of the latch guide. Radial positioning of the latches is not effected by the guide recess but rather by a control surface against which the latches preferably rest with a radially outer end region, this control surface being formed on a guide sleeve. Since the latch guide is received on the guide sleeve so as to be relatively movable, in particular linearly movable, a displacement of the latch guide relative to the guide sleeve results in a rolling movement or sliding movement of the latches on the control surface, whereby a radial position of the latches can be changed.

It is advantageous if the guide sleeve has a circular annular (ring shaped) space, which annular space is open on one side in the axial direction and if the latch guide is assigned an annular (ring shaped) piston which is received in the annular space in an axially movable sealing manner, so that the annular space and the annular piston delimit a variable-size working space to form a (ring shaped) fluid actuator for axial displacement of the latch guide and for actuation of the latches. The annular space can also be described as a circumferential groove in the guide sleeve, which has a radially inner first inner wall, a radially outer second inner wall lying opposite the first inner wall, and an axially aligned base region or wall of annular design, and wherein an axially oriented opening of the annular groove is closed by an annular piston of annular design, wherein the annular piston may be realized with a square or rectangular cross-section. Together with the annular space, this annular piston thus forms a variable-size fluid working chamber to which a pressurized fluid, in particular compressed air or hydraulic oil, can be applied and as a result a fluid actuator is provided with the aforementioned components. This allows a pressure-dependent enlargement of the working space, which is accompanied by an axial relative movement of the annular piston with respect to the guide sleeve. In the course of this axial relative movement of the annular piston, the latches accommodated in the guide recesses of the latch guide are displaced, depending on the design of the control surface formed on the guide sleeve, at least in the radial direction or in a superimposed relative movement in both the radial and axial directions in order to lock or release the second coupling part.

In a further embodiment of the invention, it is provided that the latch guide is movably supported in the stator between a locking position for the second coupling member and an unlocking position for the second coupling member, and that the latch guide in the unlocking position engages a coupling region defined by inner surfaces of the second coupling receptacle and configured to receive the second coupling member to displace the second coupling member. The coupling region may also be described as that volume of space occupied by the second coupling member when the rotor is received in the stator and the motor spindle is in an operating condition. In particular, the coupling area is bounded by inner surfaces of an end ring associated with the second coupling receptacle and a latch guide associated with the second coupling receptacle in a radially outward direction.

The latch guide is designed in such a way that it engages at least partially in this coupling region in the unlocked position, so that a displacement of the second coupling part from the coupling region can be effected when the latch guide is transferred from the locking position to the unlocked position. This ensures that the second coupling part is displaced by a certain amount in the axial direction by the relative movement of the latch guide along the stator axis at a time when locking by the latches has already been cancelled, but there may still remain static friction between the second coupling part and the second coupling receptacle. With the displacement the static connection between the second coupling part and the second coupling receptacle is released. In particular, the axial force to be provided by the fluid actuator, which is formed from the annular space in the guide sleeve and the annular piston of the latch guide, is used for this release process.

In an advantageous further development of the invention, it is provided that at least one spring is associated with the latch guide, which spring is designed to provide an axial force acting on the latch guide in the direction of the locking position. With a spring or an arrangement of several springs, which are arranged between the latch guide and a support surface formed on the stator in such a way that they are always under a preload, it can be caused that the latch guide is held in a preferred position which is identical to the locking position for the latch guide in the absence of pressurization of the fluid actuator. Accordingly, the latch guide preloaded with the springs can also be referred to as normally locked or normally closed. This locking is then released by pressurizing the fluid actuator, which fluid actuator is dimensioned (and can be supplied with appropriately pressurized fluid) such that it overcomes the preload force for the spring and provides the deformation energy for the spring which is necessary for axial displacement of the latch guide.

It is expedient if the rolling elements of the second rolling bearing are designed as cylindrical rollers aligned parallel to the rotor axis and if the inner ring of the second rolling bearing is provided with a circumferential annular groove, the side walls of which are designed for axial guidance of the cylindrical rollers, and if the outer ring of the second rolling bearing has an inner surface of circular cylindrical design against which the cylindrical rollers bear. Such a rolling bearing is also referred to as a cylindrical roller bearing with a brushless outer ring and enables a heavy-duty rolling bearing arrangement for the second coupling part relative to the rotor shaft as an axial loose bearing. To prevent undesired disengagement of this cylindrical roller bearing, the outer ring of the second rolling bearing is accommodated in the second coupling part, which can be displaced along the rotor axis between the first functional position and the second functional position but is limited in its axial deflection by the respective first and second linear stops in such a way that removal of the rolling elements from the bearing gap between the inner ring and outer ring is prevented.

It is advantageous if the outer surface of the second coupling part together with the latch recess forms a displacement surface for the latch, which is designed for a radially outward displacement of the latch during an axial displacement of the latch guide from the locking position to the unlocking position. This displacement surface is preferably adapted to the latch and the control surface formed on the guide sleeve in such a way that a positive guidance results for the latch, in which an at least substantially predictable radial and axial positioning of the respective latch is ensured for each axial position of the latch guide relative to the guide sleeve. Exemplarily, it is provided that the inclined surface bounded by the latch recess merges into a circular-cylindrical outer surface of the second coupling part, with which, in the event of an axial displacement of the second coupling part relative to the latch, the desired forced displacement of the latch in the radially outward direction is ensured due to the geometry of the inclined surface and subsequently a securing of the radially outward position of the latch is ensured by the circular-cylindrical outer circumferential surface of the second coupling part.

Advantageously, the stator equipped with the first magnetic system and the rotor equipped with the second magnetic system form an electric motor selected from the group consisting of: synchronous motor, asynchronous motor, wherein the first magnetic system and the second magnetic system each comprise at least one component selected from the group consisting of: solenoid coil, short-circuit coil, permanent magnet.

BRIEF DESCRIPTION OF THE DRAWINGS

An advantageous embodiment of the invention is shown in the drawing. Hereby shows.

DETAILED DESCRIPTION

Figure 1:
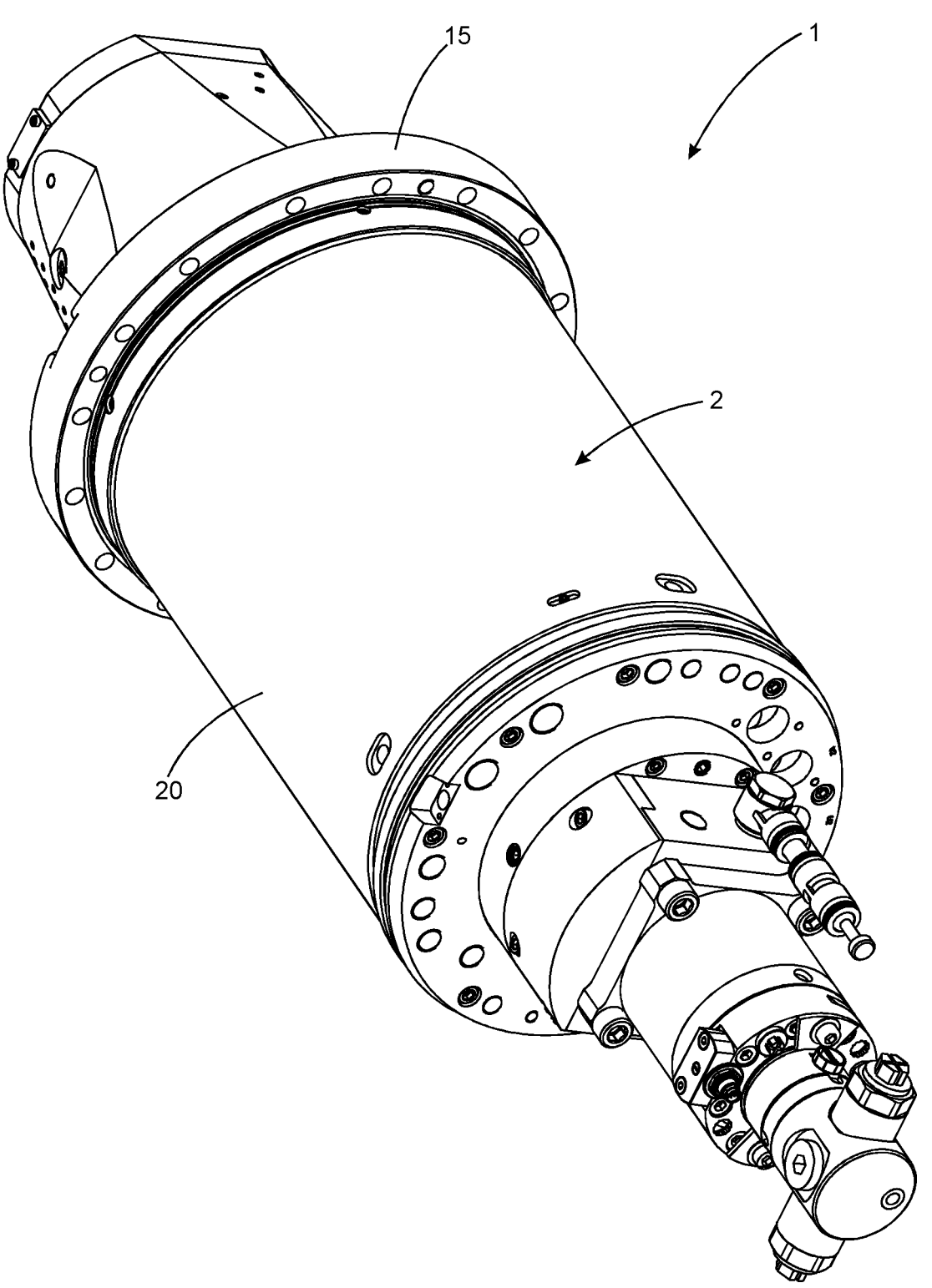
FIG. 1 a perspective overview of a motor spindle.
Figures 2, 3:
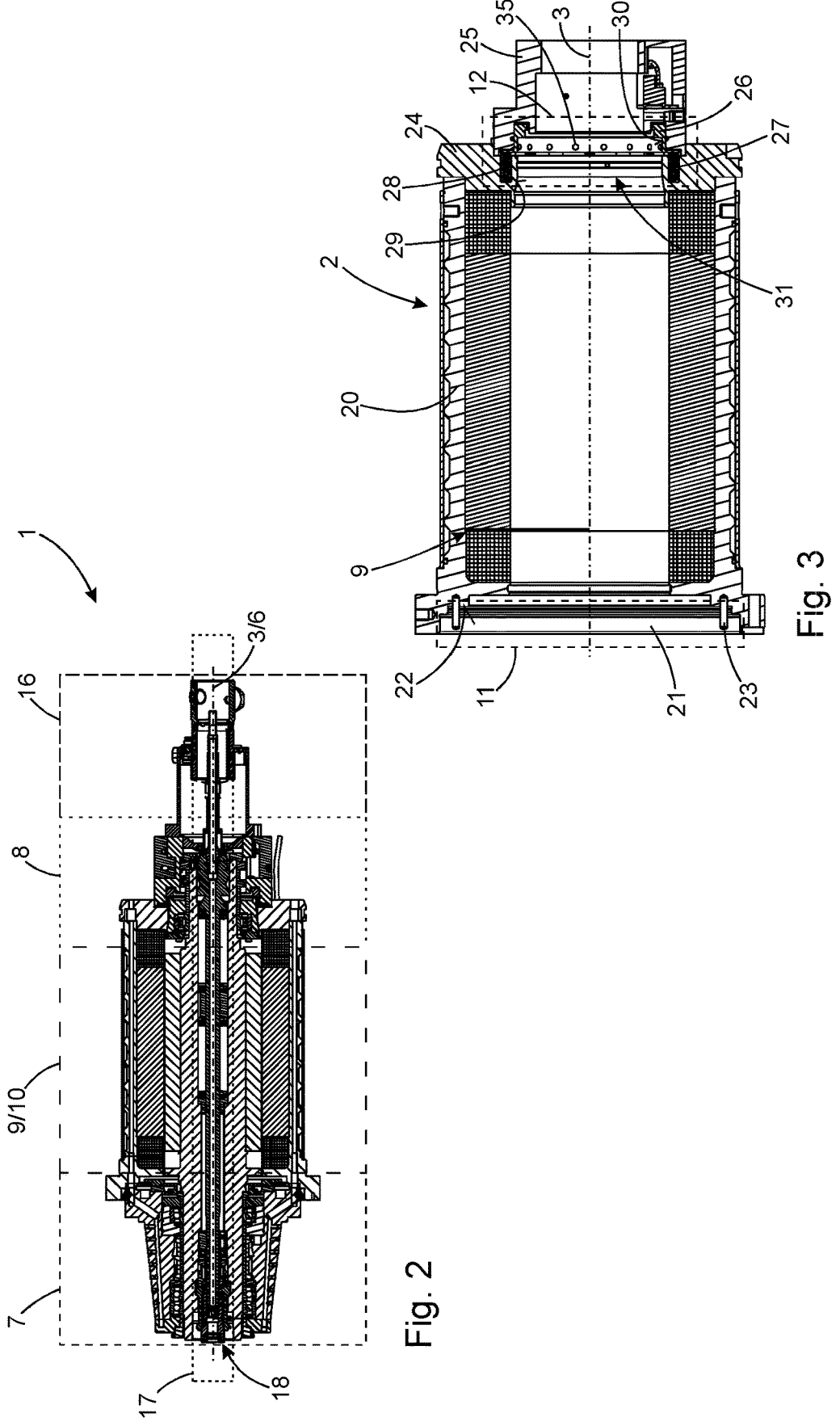
FIG. 2 a sectional view of the motor spindle according to FIG. 1 with schematically drawn functional areas, FIG. 3 a sectional view of the stator of the motor spindle according to FIGS. 1 and 2, FIG. 4 a sectional view of the rotor for the motor spindle according to FIGS. 1 and 2, FIG. 5 a cutaway view of the second coupling receptacle in a locked position for the second coupling part of the rotor, FIG. 6 the cutaway view according to FIG. 5 for an unlocked position of the second coupling part received in the second coupling receptacle, and FIG. 7 the cutaway view according to FIG. 5 for a release position of the second coupling part received in the second coupling receptacle.

A motor spindle 1 shown in FIGS. 1 and 2 is intended for use in a machining center and serves to clamp and rotationally drive a cutting tool not shown, such as a milling cutter. For coupling to a motor spindle receptacle of the machining center, which is not shown either, the motor spindle has a fastening ring 15 with which the motor spindle 1 can be fastened in the motor spindle receptacle with a high degree of precision and repeatability.

Figure 4:
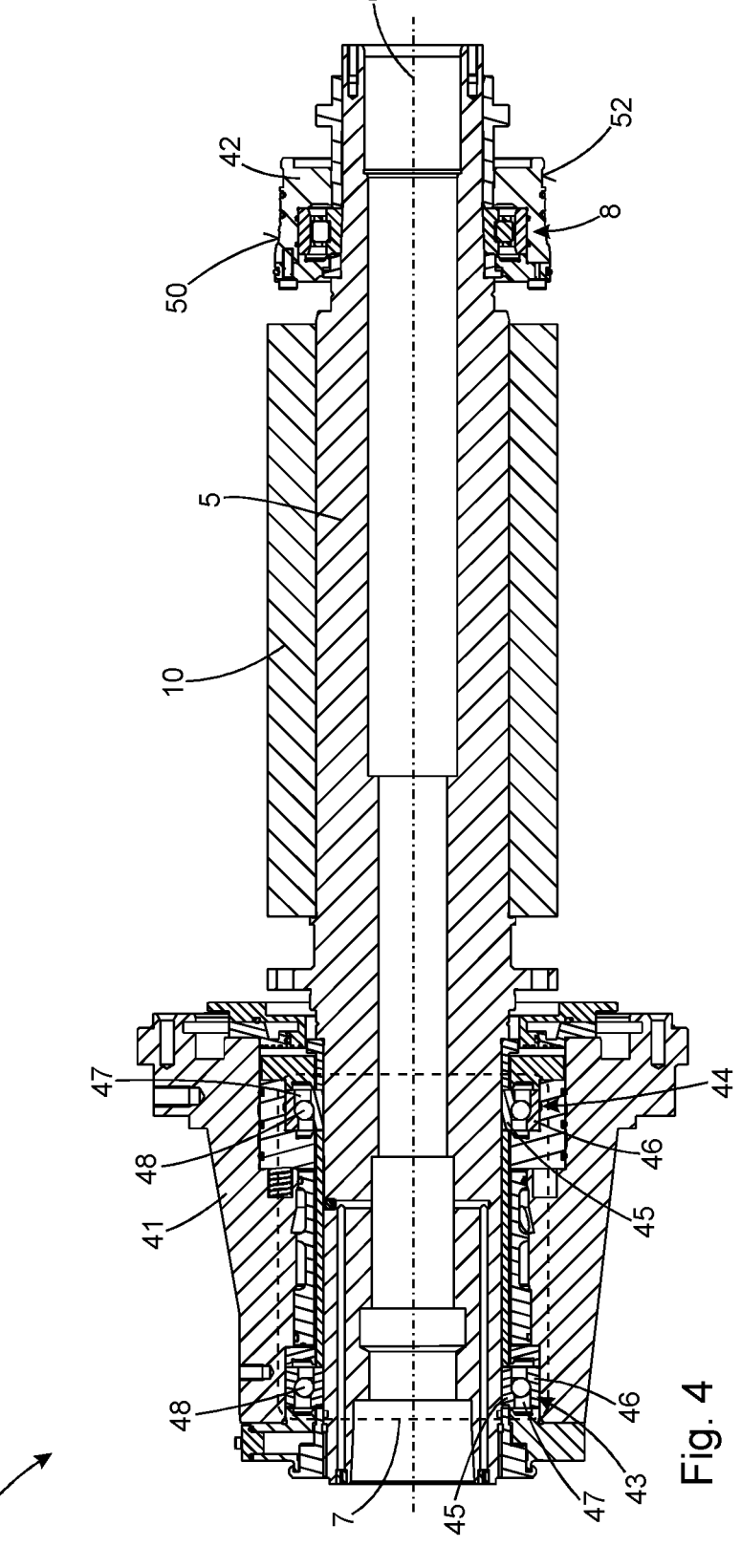

The motor spindle 1 comprises a sleeve-shaped stator 2, the substantially circular cylindrical geometry of the stator 2 defining a stator axis 3. A rotor 4, shown in more detail in FIG. 4, is rotatably received in the stator 2 and comprises a rotor shaft 5 which is substantially tubular in shape and extends along a rotor axis 6. In an operating state as shown in FIG. 2, the rotor 4 is rotatably received in the stator 2 in such a way that the rotor axis 6 is identical to the stator axis 3.

The illustration of FIG. 2 serves merely as a schematic overview, in which a total of five different functional areas of the motor spindle 1 are symbolically framed with differently dashed boxes.

The first functional area is essentially determined by the first rolling bearing 7, which is an axial fixed bearing.

The second functional area comprises the first magnet system 9 associated with the stator 2 and the second magnet system 10 associated with the rotor 4 and thus forms the electromotive core of the motor spindle 1, since in this functional area magnetic interaction between the first magnet system 9 and the second magnet system 10 causes a torque to be provided to the rotor shaft 5.

The third functional area comprises the second rolling bearing 8 and will be described in more detail below in connection with FIGS. 4 to 7.

The fourth functional area comprises an actuator 16 configured to provide a linear motion aligned along the rotor axis 6, which linear motion is introduced onto a clamping device 17 arranged in the fifth functional area. The task of the clamping device 17 is to receive a cutting tool not shown in more detail, for example a milling cutter or a drill, in a collet 18 arranged in the rotor shaft 5 in the first functional area.

Accordingly, the motor spindle 1 can be used to initiate a rotational relative movement of the rotor 4 with respect to the stator 2 by providing electrical energy to the first magnetic system 9 and/or the second magnetic system 10, whereby this rotational movement can be transmitted to a cutting tool, not shown, accommodated in the collet 18. With the aid of the cutting tool a cutting operation, in particular a milling operation or a drilling operation, can then be carried out, for example.

The stator 2 shown in more detail in FIG. 3 comprises purely by way of example a tubular stator housing 20 which is rotationally symmetrical with respect to the stator axis 3 and which is equipped with a first coupling receptacle 11 at a first end region and with a second coupling receptacle 12 at a second end region facing away from the first end region. Purely by way of example, the first coupling receptacle 11 is implemented as a stepped bore 21 with several bore sections, each of circular cylindrical design. On an axially aligned end face 22 of the stepped bore 21, purely by way of example, two locating pins 23 are arranged which are aligned parallel to the stator axis 3 and which are provided for a rotationally fixed and centered reception of the first coupling part 41 of the rotor 4 described in more detail below in connection with FIG. 4.

The second coupling receptacle 12, provided at a second end region of the stator housing 20, comprises an end ring 24 which is fixedly connected to the stator housing 20 in a manner not shown in more detail and to which a guide sleeve 25 is fixed. A latch guide 26 is received in the guide sleeve 25 so as to be linearly movable, which latch guide 26 is held by compression springs 27 in a locking position explained in more detail below. For this purpose, the compression springs 27 are accommodated in bores 28 which are provided in the end face of the end ring 24.

The rotor 4 shown in more detail in FIG. 4 comprises the first rolling bearing 7, which is designed as an axial fixed bearing, and the second rolling bearing 8, which is designed as an axial loose bearing. Here, the first rolling bearing 7 is assigned the first coupling part 41, which is provided for mounting in the first coupling receptacle 11. The second rolling bearing 8 comprises a second coupling part 42, which is provided for mounting in the second coupling receptacle 12 of the stator 2.

Between the first coupling part 41 and the rotor shaft 5, the first rolling bearing 7 is provided to allow low-friction rotational movement of the rotor shaft 5 relative to the first coupling part 41. Purely by way of example, the first rolling bearing 7 comprises a first angular ball bearing 43 and a second angular ball bearing 44. Both angular ball bearings 43, 44 each have an inner ring 45 fixed to the rotor shaft 5 and an outer ring 46 fixed to the first coupling part 41. In a bearing gap 47 between the respective inner ring 45 and the respective outer ring 46 are arranged a plurality of rolling elements 48 of spherical design, purely by way of example. The remaining components accommodated in the first coupling part serve essentially to brace the respective inner ring 45 or outer rings 46 and to ensure a seal for the two angular ball bearings 43 and 44 and are not described in more detail below.

At an end region of the rotor shaft 5 facing away from the first rolling bearing 7, the second rolling bearing 8 is arranged, which is designed as an axial loose bearing in order to avoid a static indeterminacy or static overdeterminacy for the bearing of the rotor 4 on the stator 2. Furthermore, between the first rolling bearing 7 and the second rolling bearing 8, the second magnet system 10 is arranged on the rotor shaft 5, which may be, for example, a short-circuit coil (not shown in more detail).

Figure 5:
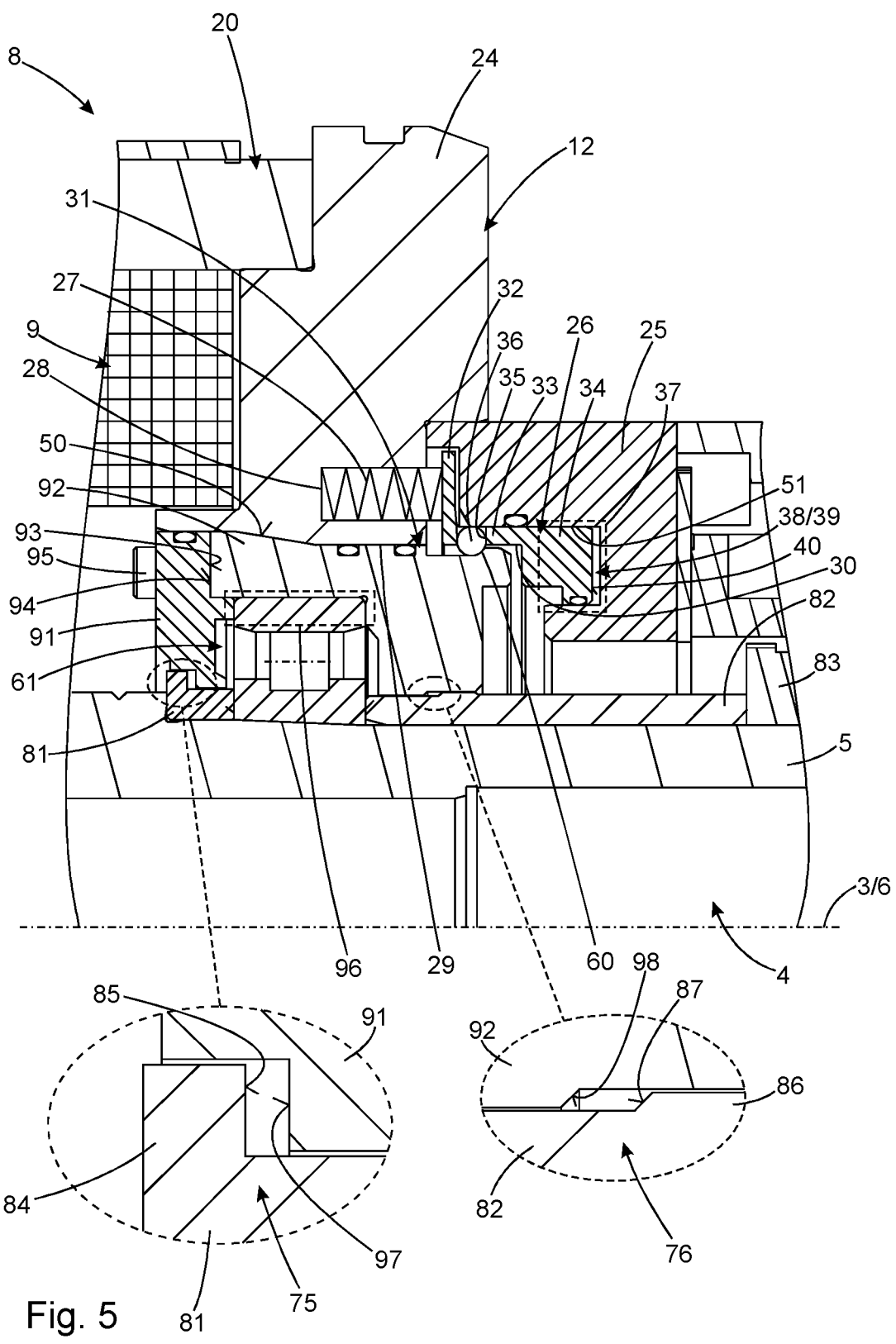
Figure 6:
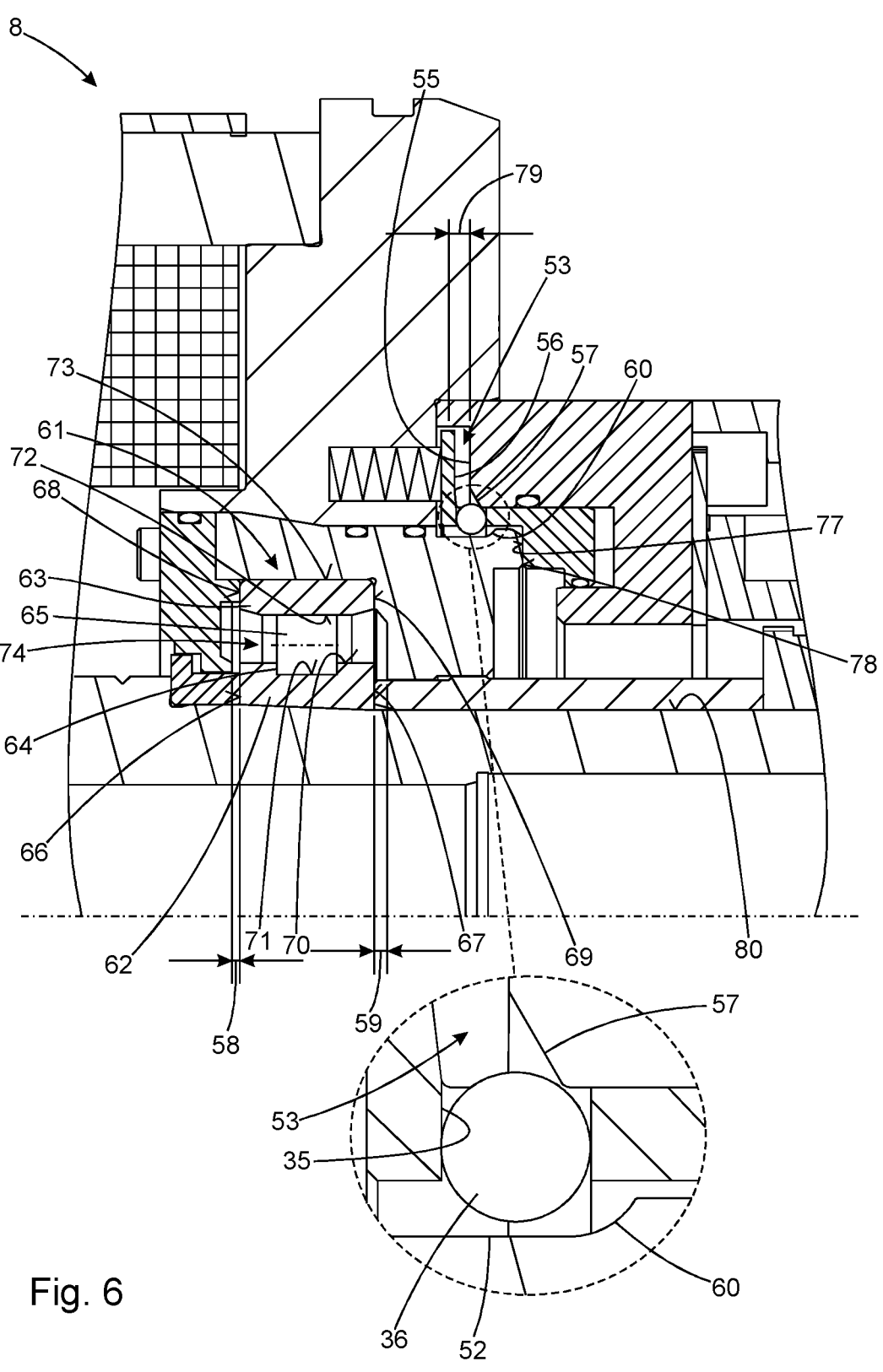
Figure 7:
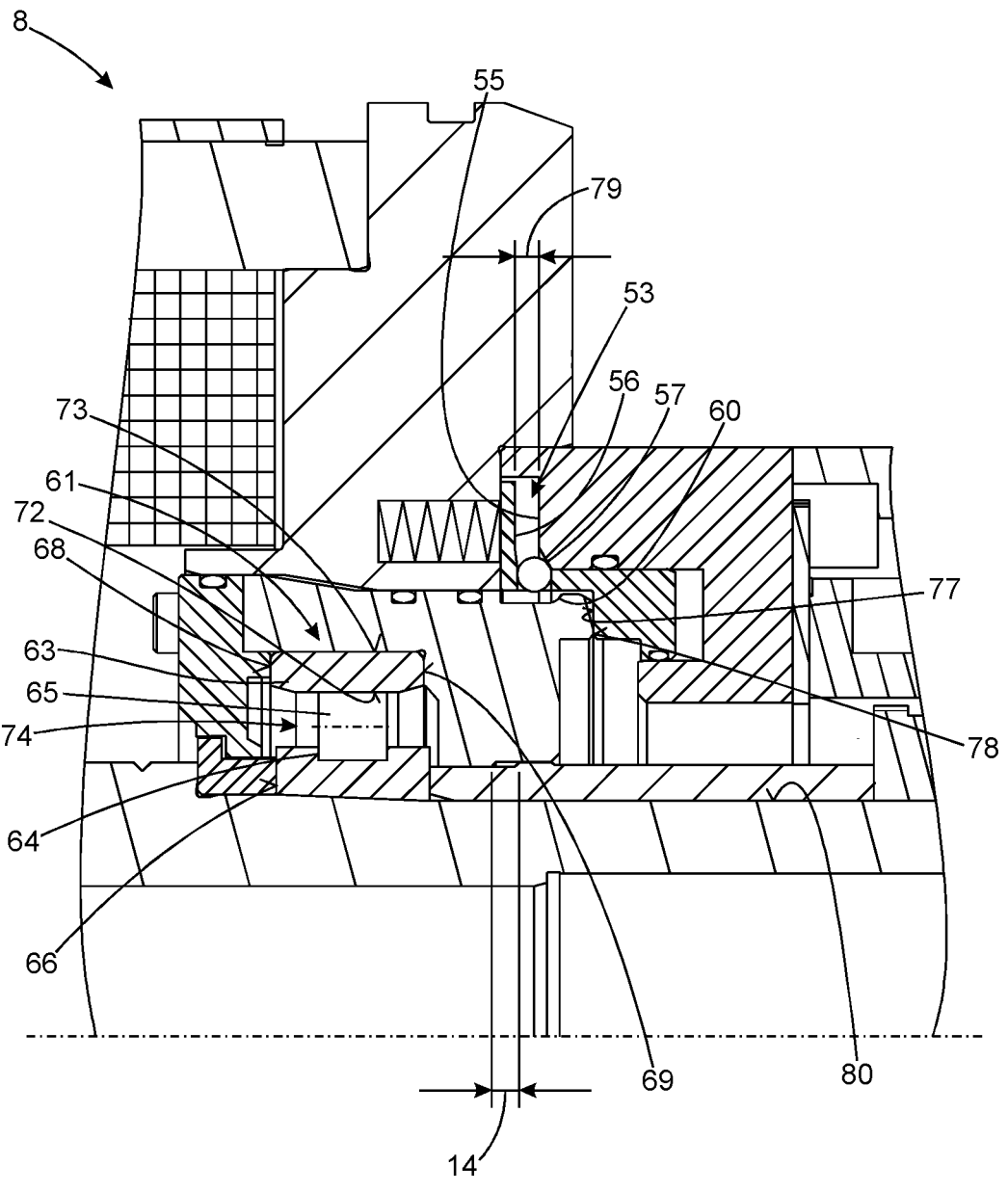

As can be seen from the illustrations of FIGS. 5 to 7, the second rolling bearing 8 comprises, purely by way of example, a cylindrical roller bearing 61, with the aid of which the rotor shaft 5 is mounted so as to be rotatably movable relative to the second coupling part 42.

The cylindrical roller bearing 61 comprises an inner ring 62, which bears with an inner circumferential surface 70 against an outer circumferential surface 80 of the rotor shaft 5 and which is fixedly secured to the rotor shaft 5 by a support ring 81 supported on the rotor shaft 5, a thrust sleeve 82 and a screw ring 83 screwed to the rotor shaft 5. An outer ring 63 of the cylindrical roller bearing 61 is arranged coaxially with the inner ring 62 and with the rotor axis 6 and is fixed in the second coupling part 42, which is of purely exemplary two-part design.

In an exemplary manner, the second coupling part 42 comprises a first ring part 91 and a second ring part 92, the first ring part 91 bearing with an axial end face 93 against an axial end face 94 of the second ring part 92 and being connected to the second ring part 92 by means of a plurality of axially aligned fastening screws 95. The first and second ring parts 91, 92, each formed as rotationally symmetrical to the rotor axis 6, delimit a circumferential annular groove 96 which is open inwardly in the radial direction and in which the outer ring 63 is received. By way of example, the geometry of the first ring part 91, the second ring part 92 and the outer ring 63 are matched to one another in such a way that the outer ring 63 is positively received in the annular groove 96 both in the axial direction and in the radial direction.

A bearing gap 74 is formed between the inner ring 62 and the outer ring 63, which is defined in the radially inward direction by a groove surface 71 of a groove 64 formed in the inner ring 62 and open in the radially outward direction, and in the radially outward direction by an inner circumferential surface 72 of the outer ring 63. A plurality of rolling elements 65 designed as cylindrical rollers are arranged in this bearing gap 74, which perform rolling movements relative to the groove surface 71 and relative to the inner circumferential surface 72 of the outer ring 63, respectively, during a rotational relative movement of the outer ring 63 with respect to the inner ring 62.

It is further provided that the inner circumferential surface 72 of the outer ring 63 is circular-cylindrical in shape, so that axial displacement of the outer ring 63 relative to the rolling element 65 is possible. An axial relative movement of the outer ring 63 with respect to the inner ring 62 is limited by a first linear stop 75 formed between the first ring part 91 and the support ring 81, and by a second linear stop 76 formed between the second ring part 92 and the thrust sleeve 82.

By way of example, it is provided that the support ring 81 has an L-shaped profiling in the sectional view according to FIGS. 5 to 7, wherein by means of this profiling a radially outwardly projecting annular collar 84 provides a stop surface arranged opposite the first annular part 91 and aligned in the axial direction, against which an oppositely aligned axial end surface 97 can come into contact in a first functional position of the second coupling part 42, which is not shown, and whereby the first linear stop 75 is formed with these components.

Similarly, the thrust sleeve 82 is provided with a circumferential annular collar 86 whose abutment surface 87 formed in the direction of the cylindrical roller bearing 61 is arranged opposite to an oppositely oriented axial end surface 98 of the second annular portion 92 to form the second linear stop 76. Accordingly, an adjustment path 14 for the second coupling part 42 along the rotor axis 6 is limited by the first linear stop 75 and the second linear stop 76.

The outer diameters, not further specified, of the support ring 81 and of the thrust sleeve 82 are matched to the inner diameters, not specified, of the first ring part 91 and of the second ring part 92 in such a way that there is always an air gap extending in the radial direction between the respective opposing components, so that there is no contact between the support ring 81 and the first ring part 91 or between the thrust sleeve 82 and the second ring part 92 during rotation of the rotor shaft 5 about the rotor axis 6.

As can be further seen from the illustration of FIGS. 5 to 7, the second coupling part 42 has an outer surface 50 which is formed, at least in regions, in the shape of a conical section and which is geometrically similar, in particular identical, to an inner surface 29 of the end ring 24 which is formed in the shape of a conical section. It is further provided that the inner surface 29 of the end ring 24, together with an inner surface 30 of the latch guide 26 as well as with the support ring 81 and the thrust sleeve 82, delimits a coupling region 31 which can be reduced in size by an axial displacement of the latch guide 26 described in more detail below, starting from the representation of FIG. 5.

By way of example, the latch guide 26 comprises a support ring 32 of annular design, which is adjoined in the axial direction along the stator axis 3 by a latch sleeve 33 of annular cylindrical design, which in turn is connected to an annular piston 34. In principle, the latch guide 26 is a component that is rotationally symmetrical with respect to the stator axis 3; only the bores 35 made in the latch sleeve 33 and pointing outward in the radial direction, which are provided to receive the latch balls 36 serving as latches, represent a deviation from the rotationally symmetrical geometry of the latch guide 26.

By way of example, it is provided that the annular piston 34 is received in an axial groove 37 of the guide sleeve 25, which is formed rotationally symmetrical to the rotor axis 3, in a linearly movable and sealing manner and thus makes it possible to use an annular space 38, which is bounded by the axial groove 37, as a variable-size working space 39. Here, the size of the working space 39 is dependent on an axial position of the latch guide 26 relative to the guide sleeve 25.

As can also be seen from the illustrations in FIGS. 5 to 7, when pressure is applied to the working space 39 and the resulting force is exerted on an axial end face 40 of the annular piston 34, the latch guide 26 is axially displaced from the locking position as shown in FIG. 5 to an unlocking position as shown in FIG. 7. In the course of this displacement movement for the latch guide 26 between the locking position and the unlocking position, a compression force acting on the compression springs 27 results in an elastic deformation of the compression springs 27. On the other hand, the latch balls 36 are axially displaced along the stator axis 3, causing an unlocking action between the latch balls 36 and the second coupling part 42, as will be described in more detail below.

FIG. 5 shows that the exemplary locking ball 36 is positively received in the locking position between a circular cylindrical inner surface 51 of the guide sleeve 25, the associated bore 35 in the locking sleeve 33 of the locking guide 26 and a locking recess 52 formed in the outer surface 50 of the second coupling part 42. This ensures reliable locking of the second coupling part 42 in the stator 2. In this locking position, a first distance 58 is present between the first ring part 91 and the oppositely arranged first axial surface 66 of the inner ring 62, and a second distance 59 is present between the second ring part 92 and the oppositely arranged second axial surface 67 of the inner ring 62.

When pressure is applied to the working chamber 39, the annular piston 34 of the latch guide 26, which is received in the guide sleeve 25 in a sealing and sliding manner in the axial direction, is displaced in the direction of the first rolling bearing 7 with simultaneous compression of the compression spring 27, as shown in FIG. 6. In this case, an deflection gap 53 pointing outward in the radial direction opens up between the support ring 32 and the guide sleeve 25 between an axial surface 55 of the guide sleeve 25 and an oppositely arranged axial surface 56 of the support ring 32. In order to enable an early deflection movement of the locking ball 36 in a radially outward direction, even before it can evade into the deflection gap 53, a transition region between the circular-cylindrical inner surface 51 of the guide sleeve 25 and the axial surface 55 is provided with a chamfer 57 of purely exemplary conical sectional design. This chamfer 57, which is also referred to as the control surface, permits a radial displacement of the locking ball 36 outwardly even before the deflection gap 53 is fully opened.

Furthermore, the displacement of the locking ball 36 into the deflection gap is supported by the geometry of the locking recess 52, which, purely by way of example, is provided as a radially inwardly pierced groove in the outer surface 50 of the second coupling part 42 and which has a groove wall 60 adapted to the geometry of the locking ball 36. Exemplarily, the groove wall 60 is formed with a quarter-circular profiling and thus enables, on the one hand, a flat contact of the latch ball 36 in the locking position and, on the other hand, a displacement of the latch ball 36 during the axial relative movement of the latch guide 26 with respect to the guide sleeve 25.

This displacement of the latch ball 36 removes the interlock with the second coupling part 42, so that when a tensile force is applied to the rotor 4, directed to the left according to the illustration of FIG. 6, removal of the rotor 4 from the stator 2 is made possible.

Typically, however, it can be assumed that due to the forces transmitted from the latch balls 36 to the second coupling part 42 in the locked state, in particular in the region of the groove wall 60, which result in force components both in the axial direction and in the radial direction, a considerable static friction is caused between the outer surface 50 of the second coupling part 42 and the inner surface 29 of the end ring 24. This static friction is further increased by influences such as contamination and/or fretting corrosion, so that simple manual removal of the rotor 4 from the stator 2 is not to be expected. In order to facilitate removal of the rotor 4 from the stator 2, it is therefore provided that the latch guide 26, which together with the guide sleeve 25 forms a fluid actuator, comes into contact with an end face 77 formed on the annular piston 34, purely by way of example, with an end face 78 of the second coupling part 42 before a maximum travel 79 of the latch guide 26 is reached. Accordingly, when the end face 77 of the annular piston 34 comes into contact with the end face 78 of the second coupling part 42, a force is introduced from the latch guide 26 to the second coupling part 42, whereby the latter can be displaced from the locking position into the unlocking position, as shown in FIG. 7.

This results in an axial displacement of the second coupling part 42 as well as the outer ring 63 accommodated therein relative to the inner ring 62 with the rolling elements 65 accommodated therein, whereby the second coupling part 42 is limited in its relative movement with respect to the rotor shaft 5 by the first linear stop 75 and the second linear stop 76 in such a way that the guiding effect for the rolling elements 65 is always ensured by the outer ring 63. Furthermore, the first ring part 91 as well as the second ring part 92 are matched to the inner ring 62 of the cylindrical roller bearing 61 in such a way that along the entire adjustment path 14 the first distance 58 and the second distance 59 always do not approach zero or disappear, which also ensures unproblematic handling of the rotor 4 in the dismantled state outside the stator 2.

What is claimed is:

1. A motor spindle for driving a machining tool, comprising a sleeve-shaped stator extending along a stator axis, which stator has a first magnet system, a first coupling receptacle and a second coupling receptacle, and further comprising a rotor, which has a rotor shaft extending along a rotor axis, a second magnet system, a first coupling part and a second coupling part, wherein the first coupling part is mounted to the first coupling receptacle and is connected with the rotor shaft so as to be rotatable about the rotor axis by means of a first rolling bearing serving as an axial fixed bearing, and wherein the second coupling part is mounted to the second coupling receptacle and is connected with the rotor shaft so as to be rotatable about the rotor axis by means of a second rolling bearing serving as an axial loose bearing, wherein the second rolling bearing comprises an inner ring mounted on the rotor shaft and an outer ring arranged coaxially to the inner ring and mounted on the second coupling part, which outer ring defines with the inner ring an annular bearing gap in which a plurality of rolling elements are accommodated, the second coupling part being accommodated on the rotor shaft so as to be axially movable parallel to the rotor axis between a locked position and a release position along a movement path, wherein a minimum distance between a first axial surface of the inner ring and the second coupling part and a minimum distance between a second axial surface of the inner ring, which faces away from the first axial surface, and the second coupling part are always greater than zero for the entire movement path.

2. A motor spindle for driving a machining tool, comprising a sleeve-shaped stator extending along a stator axis, which stator has a first magnet system, a first coupling receptacle and a second coupling receptacle, and further comprising a rotor, which has a rotor shaft extending along a rotor axis, a second magnet system, a first coupling part and a second coupling part, wherein the first coupling part is mounted to the first coupling receptacle and is connected with the rotor shaft so as to be rotatable about the rotor axis by means of a first rolling bearing serving as an axial fixed bearing, and wherein the second coupling part is mounted to the second coupling receptacle and is connected with the rotor shaft so as to be rotatable about the rotor axis by means of a second rolling bearing serving as an axial loose bearing, wherein the second rolling bearing comprises an inner ring mounted on the rotor shaft and an outer ring arranged coaxially to the inner ring and mounted on the second coupling part, which outer ring defines with the inner ring an annular bearing gap in which a plurality of rolling elements are accommodated, the second coupling part being accommodated on the rotor shaft so as to be axially movable parallel to the rotor axis between a locked position and a release position along a movement path, wherein a minimum distance between a first axial surface of the inner ring and the second coupling part and a minimum distance between a second axial surface of the inner ring, which faces away from the first axial surface, and the second coupling part are always greater than zero for the entire movement path, and wherein at least one latch recess is formed on an outer surface of the second coupling part, and wherein the second coupling receptacle is provided on an inner circumferential surface with a plurality of latches, the latches being adjustable between a release position and a locking position and wherein the latches are in positive engagement with the at least one latch recess in the locking position.

3. The motor spindle according to claim 2, wherein, in the locking position, the latches bear against an inclined surface of the at least one latch recess, the inclined surface being aligned at an acute angle to the rotor axis.

4. The motor spindle according to claim 1, wherein an inner surface of the second coupling receptacle and an outer surface of the second coupling part are geometrically similar in order to ensure positive reception of the second coupling part in the second coupling receptacle both in the radial direction and in a locking direction aligned along the rotor axis.

5. The motor spindle according to claim 1, wherein a first linear stop is located on the rotor shaft, against which the second coupling part bears in the first functional position, and wherein a second linear stop is located on the rotor shaft, against which the second coupling part bears in the second functional position.

6. A motor spindle for driving a machining tool, comprising a sleeve-shaped stator extending along a stator axis, which stator has a first magnet system, a first coupling receptacle and a second coupling receptacle, and further comprising a rotor, which has a rotor shaft extending along a rotor axis, a second magnet system, a first coupling part and a second coupling part, wherein the first coupling part is mounted to the first coupling receptacle and is connected with the rotor shaft so as to be rotatable about the rotor axis by means of a first rolling bearing serving as an axial fixed bearing, and wherein the second coupling part is mounted to the second coupling receptacle and is connected with the rotor shaft so as to be rotatable about the rotor axis by means of a second rolling bearing serving as an axial loose bearing, wherein the second rolling bearing comprises an inner ring mounted on the rotor shaft and an outer ring arranged coaxially to the inner ring and mounted on the second coupling part, which outer ring defines with the inner ring an annular bearing gap in which a plurality of rolling elements are accommodated, the second coupling part being accommodated on the rotor shaft so as to be axially movable parallel to the rotor axis between a locked position and a release position along a movement path, wherein a minimum distance between a first axial surface of the inner ring and the second coupling part and a minimum distance between a second axial surface of the inner ring, which faces away from the first axial surface, and the second coupling part are always greater than zero for the entire movement path, and wherein the second coupling receptacle has a latch guide which is displaceable in a relatively movable manner along the stator axis and is provided with guide recesses in which a plurality of latches are received in a movable manner transversely with respect to the stator axis, wherein the latch guide is movably mounted on a guide sleeve which is provided with a control surface which serves for a movement control of the latches in such a way that a relative movement of the latch guide relative to the guide sleeve causes a displacement of the latches in the radial direction.

7. The motor spindle according to claim 6, wherein the guide sleeve has a circular annular space which is open on one side in the axial direction and wherein the latch guide is assigned an annular piston which is received in the annular space in an axially movable manner, wherein the annular space and the annular piston delimit a variable-size working space of a fluid actuator for axial displacement of the latch guide and for actuation of the latches.

8. The motor spindle according to claim 7, wherein the latch guide is movably mounted in the stator between a locking position for the second coupling part and an unlocking position for the second coupling part, and wherein the latch guide in the unlocking position engages with an inner surface of the second coupling receptacle, which inner surface receives the second coupling part to enable a displacement of the second coupling part.

9. The motor spindle according to claim 6, wherein at least one spring provides an axial force acting on the latch guide in the direction of the locking position.

10. The motor spindle according to claim 1, wherein the rolling bodies of the second rolling bearing are cylindrical rollers aligned parallel to the rotor axis, and wherein the inner ring of the second rolling bearing is provided with a circumferential annular groove whose side walls provide axial guidance of the cylindrical rollers, and wherein the outer ring of the second rolling bearing has a circular-cylindrical inner surface against which the cylindrical rollers bear.

11. The motor spindle according to claim 2, wherein the outer surface of the second coupling part together with the at least one latch recess forms a displacement surface for at least one of the plurality of latches.

12. The motor spindle according to claim 1, wherein the first magnet system of the stator and the second magnet system of the rotor form an electric motor, the electric motor being a synchronous motor or an asynchronous motor, and wherein the first magnet system comprises at least one component from the group: magnet coil, short-circuit coil, permanent magnet, and wherein the second magnet system comprises at least one component from the group: magnet coil, short-circuit coil, permanent magnet.

* * * * *